(12) United States Patent
Guillot et al.

(10) Patent No.: US 11,025,591 B2
(45) Date of Patent: Jun. 1, 2021

(54) METHOD FOR CONTROLLING THE FUNCTIONING OF A COMPLEX ELECTRONIC COMPONENT

(71) Applicant: SAFRAN ELECTRONICS & DEFENSE, Paris (FR)

(72) Inventors: François Guillot, Paris (FR); Jean-Marie Courteille, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 16/772,579

(22) PCT Filed: Dec. 17, 2018

(86) PCT No.: PCT/EP2018/085167
§ 371 (c)(1),
(2) Date: Jun. 12, 2020

(87) PCT Pub. No.: WO2019/121492
PCT Pub. Date: Jun. 27, 2019

(65) Prior Publication Data
US 2020/0389434 A1    Dec. 10, 2020

(30) Foreign Application Priority Data
Dec. 21, 2017    (FR) ...................................... 1762799

(51) Int. Cl.
*H04L 29/06*    (2006.01)
*H04L 9/32*    (2006.01)
(Continued)

(52) U.S. Cl.
CPC .......... *H04L 63/0236* (2013.01); *B64D 45/00* (2013.01); *G06F 11/1004* (2013.01);
(Continued)

(58) Field of Classification Search
CPC . H04L 63/0236; H04L 9/3242; H04L 9/3247; H04L 63/123; H04L 63/1416;
(Continued)

(56) References Cited

U.S. PATENT DOCUMENTS 10,491,569 B1 *   11/2019   Powell, III .......... H04L 63/0428
2005/0243789 A1 *  11/2005   Dinello ................... H04L 63/14
                                                          370/341
(Continued)

FOREIGN PATENT DOCUMENTS

EP          3240256 A1       11/2017
WO     2010/105249 A1         9/2010
WO     2012/050933 A1         4/2012

OTHER PUBLICATIONS

Jan. 23, 2019 International Search Report issued in International Patent Application No. PCT/EP2018/085167.

*Primary Examiner* — Shanto Abedin
(74) *Attorney, Agent, or Firm* — Oliff PLC; R. Brian Drozd

(57) ABSTRACT

A method for controlling the functioning of a complex electronic component transferring data frames to physical ports, the method inserts, in each data frame to be transferred by the complex electronic component, a first signature determined at least from the source address included in the data frame and from an identifier of the physical port by means of which the data frame is transferred, and transfers the data frame in which the signature has been inserted, and a routing protection device associated with the physical port receives the data frame in which the signature was inserted, determines, from the identifier of the physical port and the source address, a second signature, compares the signatures, and performs a first operation if the first and second signa- (Continued)

tures are different and a second operation if the first and second signatures are identical.

10 Claims, 3 Drawing Sheets

(51) Int. Cl.
    *G06F 11/10*     (2006.01)
    *B64D 45/00*     (2006.01)
    *H04L 29/08*     (2006.01)
(52) U.S. Cl.
    CPC ............ *H04L 9/3242* (2013.01); *H04L 67/12* (2013.01); *H04L 2209/84* (2013.01)
(58) Field of Classification Search
    CPC . B64D 45/00; G06F 11/1004; G06F 11/0757; G08G 5/00
    See application file for complete search history.

(56) References Cited

U.S. PATENT DOCUMENTS

| | | | |
|---|---|---|---|
| 2006/0143710 A1* | 6/2006 | Desai | H04L 63/123 726/23 |
| 2007/0101134 A1* | 5/2007 | Parian | H04L 63/0485 713/168 |
| 2009/0067324 A1* | 3/2009 | Licardie | H04L 47/41 370/225 |
| 2010/0152954 A1* | 6/2010 | Ric | G06F 11/2294 701/31.4 |
| 2010/0250731 A1* | 9/2010 | Xiao | H04L 63/00 709/224 |
| 2011/0126278 A1* | 5/2011 | Volpano | H04L 12/4641 726/15 |
| 2016/0366108 A1* | 12/2016 | Kamble | H04L 63/0428 |
| 2017/0250954 A1* | 8/2017 | Jain | H04L 63/1416 |
| 2018/0302331 A1* | 10/2018 | Bush | H04L 47/28 |

* cited by examiner

METHOD FOR CONTROLLING THE FUNCTIONING OF A COMPLEX ELECTRONIC COMPONENT

The present invention relates to a method and a system for controlling the functioning of a complex electronic component transferring data frames to physical ports.

Conventionally, the components used in the field of avionics are qualified to meet safety standards.

The standard DO-254 is one of these standards. It is used at the time of the design of the complex electronic equipment in the airborne systems. The complex electronic equipment comprises devices such as field-programmable gate arrays (FPGAs), programmable logic devices (PLDs) and application-specific integrated circuits (ASICs).

DO-254 defines the requirements throughout the process of design and testing of the electronic equipment. Evidence, such as for example the hardware test plan and diagrams, must be supplied to the competent authorities.

To meet the various communication requirements in an aircraft, the electronic components used in avionics are more and more complex.

Complex electronic components are available on the market. For example, there exist communication processors that combine a plurality of 64-bit processor cores with high-performance data-path acceleration logic and network peripheral bus interfaces required for the routing and the telecommunications. These components are for example used in applications such as routers, switches, internet access peripherals, firewalls and other applications.

These complex electronic components have not been designed in accordance with the standards and the requirements of avionics and do however provide functionalities that would be advantageous in the avionics field.

For example, there exist, in an aircraft, communication networks that coexist. These communication networks provide data exchanges that are vital to the functioning of the aircraft, allow message exchanges between the cockpit and the cabin crew and enable the passengers to access data or to communicate with third parties.

The various networks must be protected and isolated so as to avoid any intrusion of a third party in a network that he is not authorised to access.

An ill-intentioned passenger, connected to a communication network, of the non-secure type, open to the passengers, could for example attempt, through fraudulent operations, to access the communication network, of the secure type, allowing the exchanges of data vital to the functioning of the aircraft, in order to interfere with the functioning thereof.

The complex electronic components sometimes remain blocked at a particular step of the processing that they perform. This type of problem may become very problematic during the use thereof in systems that are embedded in an aircraft.

The complex electronic components on the market cannot be used as such in an aircraft since they cannot guarantee the best level of reliability, thus for example to prevent data being transferred to a wrong destination.

The aim of the present invention is to solve the drawbacks of the prior art by proposing a method and a system for controlling the functioning of a complex electronic component transferring data frames to physical ports that guarantee that the data are always transferred to the correct destination and which make it possible to guarantee that a complex electronic component does not remain blocked at a particular step of the processing that it is performing.

To this end, according to a first aspect, the invention proposes a method for controlling the functioning of a complex electronic component transferring data frames to physical ports, each data frame comprising at least one source address, characterised in that the method comprises the steps of:

insertion, by a software module included in the complex electronic component, in each data frame to be transferred by the complex electronic component, of a first signature determined at least from the source address included in the data frame and from an identifier of the physical port by means of which the data frame is transferred by the complex electronic component, transfer, by the complex electronic component, of the data frame in which the signature has been inserted, reception, by a routing protection device associated with the physical port, of the data frame in which the signature has been inserted, determination, by the routing protection device associated with the physical port, from the identifier of the physical port and the source address, of a second signature, comparison, by the routing protection device associated with the physical port, of the signatures, perform, by the routing protection device associated with the physical port, of a first operation if the first and second signatures are different or of a second operation if the first and second signatures are identical.

The invention also relates to a system for controlling the functioning of a complex electronic component transferring data frames to physical ports, each data frame comprising at least one source address, characterised in that the system comprises:

means for insertion, by a software module included in the complex electronic device, in each data frame to be transferred by the complex electronic component, of a first signature determined at least from the source address included in the data frame and an identifier of the physical port by means of which the data frame is transferred by the complex electronic component, means, included in the complex electronic component, for transferring the data frame in which the signature was inserted, means for reception, by a routing protection device associated with the physical port, of the data frame in which the signature was inserted, means, included in the routing protection device associated with the physical port, for determining, from the identifier of the physical port and the source address, a second signature, means, included in the routing protection device associated with the physical port, for comparing the signatures, means, included in the routing protection device associated with the physical port, for performing a first operation if the first and second signatures are different or a second operation if the first and second signatures are identical.

Thus the present invention guarantees that a complex electronic component transferring data frames to physical ports functions correctly.

By means of the addition of the software module included in the complex electronic component and of the routing protection device associated with the physical port, it is possible to prevent a data frame passing through a port to which the data frame should not go. It is then possible to use complex electronic components marketed for other purposes than aeronautics and to guarantee that a complex electronic component can function with the quality level required by the aeronautical industry.

According to a particular embodiment of the invention, the first operation is an elimination of the data frame received by the routing protection device associated with the physical port and the second operation is an elimination of the first signature in the data frame for a transfer, by the routing protection device associated with the physical port, of the data frame to a destination address included in the data frame.

Thus the present invention guarantees that the data are always transferred to the correct destination.

According to a particular embodiment of the invention, the method further comprises a step of counting the eliminated data frames.

Thus it is possible to have feedback on the reliability of the complex electronic component, or even to reinitialise the complex electronic component, when the number of data frames eliminated exceeds a predetermined threshold.

According to a particular embodiment of the invention, the signatures are also determined from the destination address.

According to a particular embodiment of the invention, the signatures are also determined from all or some of the data included in the data frame.

According to a particular embodiment of the invention, the signatures are also determined from the quantity of data included in the data frame.

According to a particular embodiment of the invention, the signatures are obtained from a function of the exclusive OR type or from a hash function using a coding key shared solely between the software module and each routing protection device.

Thus the determination of the signature is simple and rapid and is not detrimental to the speed of transfer of the data frames.

According to a particular embodiment of the invention, the data frames are predetermined service frames transferred periodically and the first operation is at least a non-processing of the service frame and an elimination of the service frame received by the routing protection device associated with the port and a reinitialisation of the complex electronic component if a predetermined number of service frames are not received during a predetermined period, and the second operation is a processing of the service frame and an elimination of the service frame received by the routing protection device associated with the port.

Thus the present invention ensures that the complex electronic component does not remain blocked at a particular step of the processing that it is performing by introducing a watchdog function. By means of this functionality, it is possible to detect a blocking of the complex electronic component and to restart the system if the sum of the number of predetermined service frames not received in a given period and of the number of service frames for which the comparison of signatures is negative in the period given by the routing protection device associated with the physical port.

According to a particular embodiment of the invention, the complex electronic component and each routing protection device associated with a physical port are included in an aircraft.

According to a particular embodiment of the invention, the aircraft comprises various secure zones.

The invention also relates to the computer programs stored on an information carrier, said programs comprising instructions for implementing the methods described above, when they are loaded into and executed by a computer system.

The features of the invention mentioned above, as well as others, will emerge more clearly from a reading of the following description of an example embodiment, said description being given in relation to the accompanying drawings, among which:

The system comprises a complex electronic component 10. The complex electronic component 10 is for example a communication processor that combines a plurality of 64-bit processor cores with high-performance data-path acceleration logic and network peripheral bus interfaces required for the routing and telecommunications.

According to the present invention, the complex electronic component 10 also comprises a software module 15 that inserts, in each data frame to be transferred by the complex electronic component 10, a first signature determined at least from the source address included in the data frame and from an identifier of the physical port by means of which the data frame will be transferred by the complex electronic component.

The complex electronic component 10 without the software module 15 is not a secure component. The system comprises a secure component 20.

A non-secure component is a device for which it is not possible to guarantee that all the functions of the device are performed in a sure manner and/or for which it is not possible to prove that the component executes all its functions in a sure manner.

A secure component is a device for which it is possible to guarantee that all the functions of the component are performed in a sure manner and/or for which it is possible to prove that the component executes all its functions in a sure manner or that any failure causes a controlled and previously anticipated behaviour.

Figure 1:
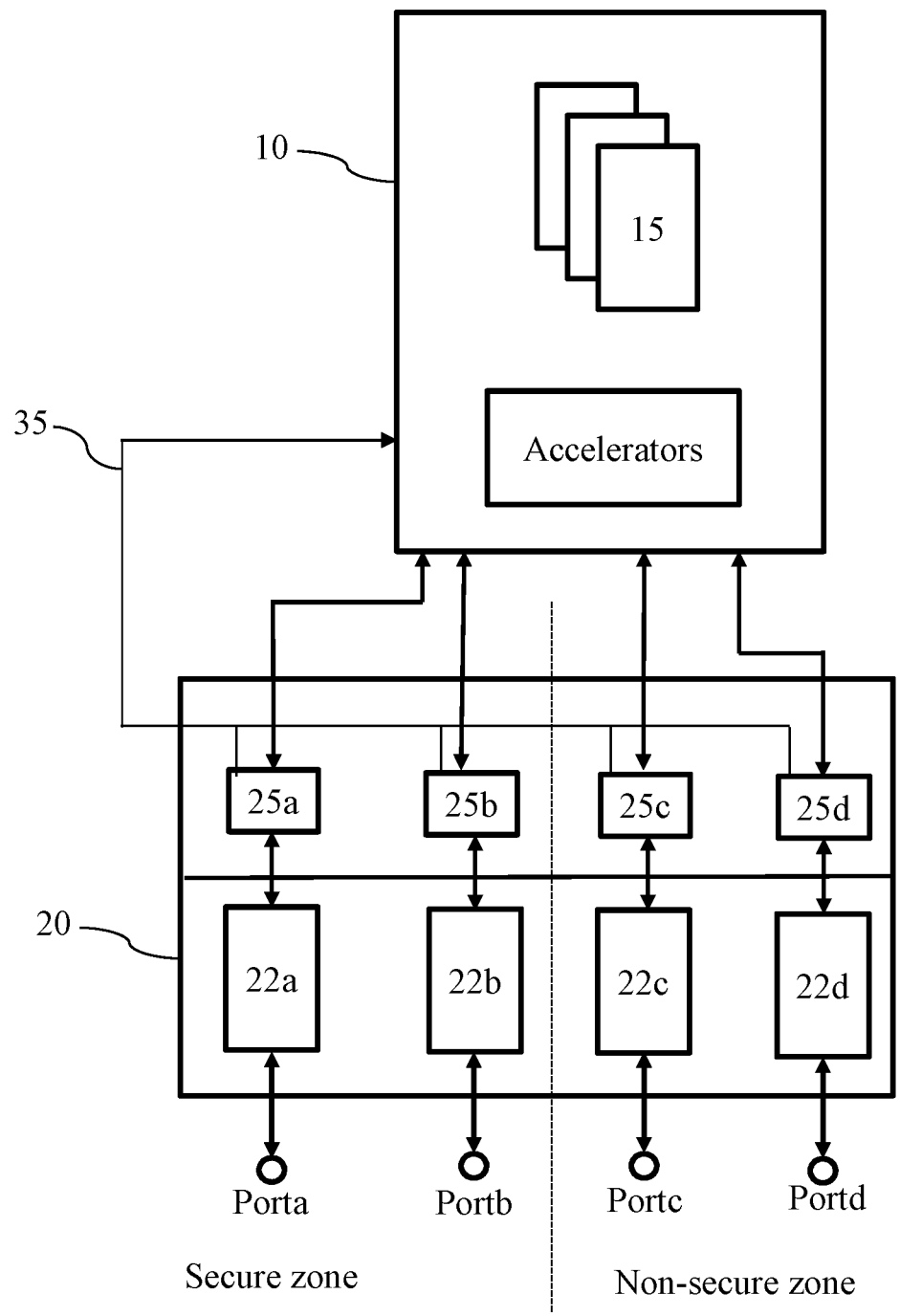
FIG. 1 shows an example of a system for controlling the functioning of a complex electronic component transferring data frames to physical ports in an aircraft comprising a secure zone and a non-secure zone.

In the example in FIG. 1, the ports Porta and Portb are ports in a secure zone of an aircraft and the ports Portc and Portd are ports in a non-secure zone of the aircraft. Naturally, the aircraft may comprise a greater number of secure zones.

In addition, the present invention guarantees that any error in routing between two different security zones is dealt with just as any error in routing between two ports in the same security zone is dealt with.

The secure component 20 comprises a plurality of physical interfaces denoted 22a to 22d and bidirectional physical ports denoted Porta to Portd.

The secure component 20 comprises, according to the present invention, a routing protection device 25a to 25d associated with each port Porta to Portd.

Each routing protection device 25a to 25d determines, from the identifier of the physical port and the source address, a second signature, compares the first and second signatures and performs a first operation if the first and second signatures are different and a second operation if the first and second signatures are identical.

For example, the first operation is an elimination of the data frame received by the routing protection device associated with the physical port and the second operation is an elimination of the first signature in the data frame for a transfer of the data frame to a destination address included in the data frame.

For example, the data frames are predetermined service frames transferred periodically. According to this example, it is possible to provide a watchdog function throughout the entire routing chain and a function of accelerating the complex electronic component 10. For this purpose, service frames are produced periodically by the software module 15. If the routing protection device 25 does not receive any of these with a correct signature during a predetermined unit of time, then the routing protection device 25 performs a reinitialisation of the complex electronic component 10 by means of a dedicated signal denoted 35 in FIG. 1. The service frames are systematically eliminated, whether the checking of the signatures be good or bad, by the routing protection device 25 and are therefore not transferred in order not to emerge on the ports Porta to Portd.

Figure 2:
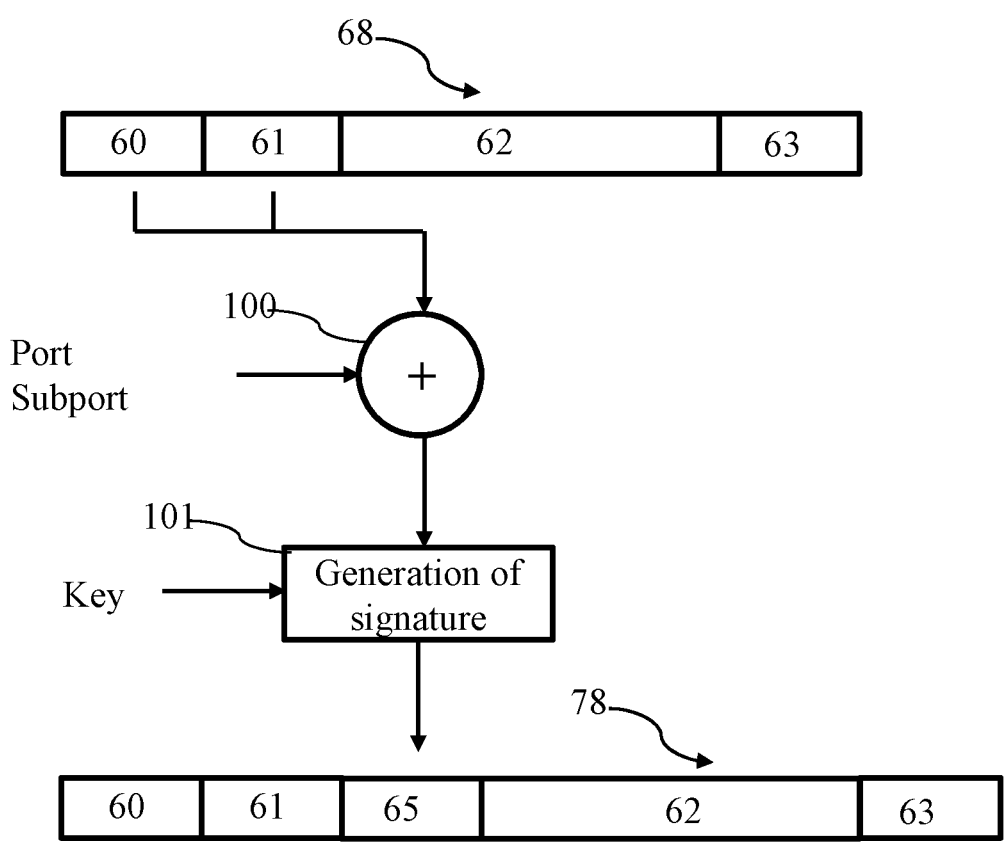
FIG. 2 shows an example of a method for inserting, by a software module included in the complex electronic component, in each data frame to be transferred by the complex electronic component, a first signature.

FIG. 2 shows an example of a method for inserting, by a software module included in the complex electronic component, in each data frame to be transferred by the complex electronic component, a first signature.

The software module 15 forms a data frame 68 that the complex electronic component 10 must transmit.

The data frame is for example produced by an application or is a predetermined service frame that must be transmitted periodically.

The field 60 of the frame comprises the destination address of the application that is to receive the data.

The field 61 of the frame comprises the source address of the application transferring the data.

The field 62 is the field comprising the data.

The field 63 is a redundant field for detecting any errors.

The software module 15, at the step 100, obtains the source address of the application sending the data in the field 61, or even the destination address, as well as the physical port or subport to which the data must be transferred.

The software module 15 generates, at the step 101, a signature at least from the source address and from the identifier of the physical port or subport obtained.

In a variant, the software module 15 generates a signature from the source address, from the physical port or subport, from the destination address, from the data and/or from the quantity of data.

The signature is simple and quick to calculate. The signature is for example a function of the exclusive OR type or a hash function using a coding key shared between the software module 15 and the routing protection device 25 but which the complex electronic component 10 will not be in a position to produce itself following any functioning or malfunctioning of one or more of the constituents thereof.

The software module 15 forms a data frame 78 comprising the signature.

The fields 60 to 63 are identical to the fields of the data frame 68.

The field 65 comprises the signature generated at step 101.

The data frame is then transferred by the complex electronic component 10 to the physical port or subport to which the data must be transferred.

Figure 3:
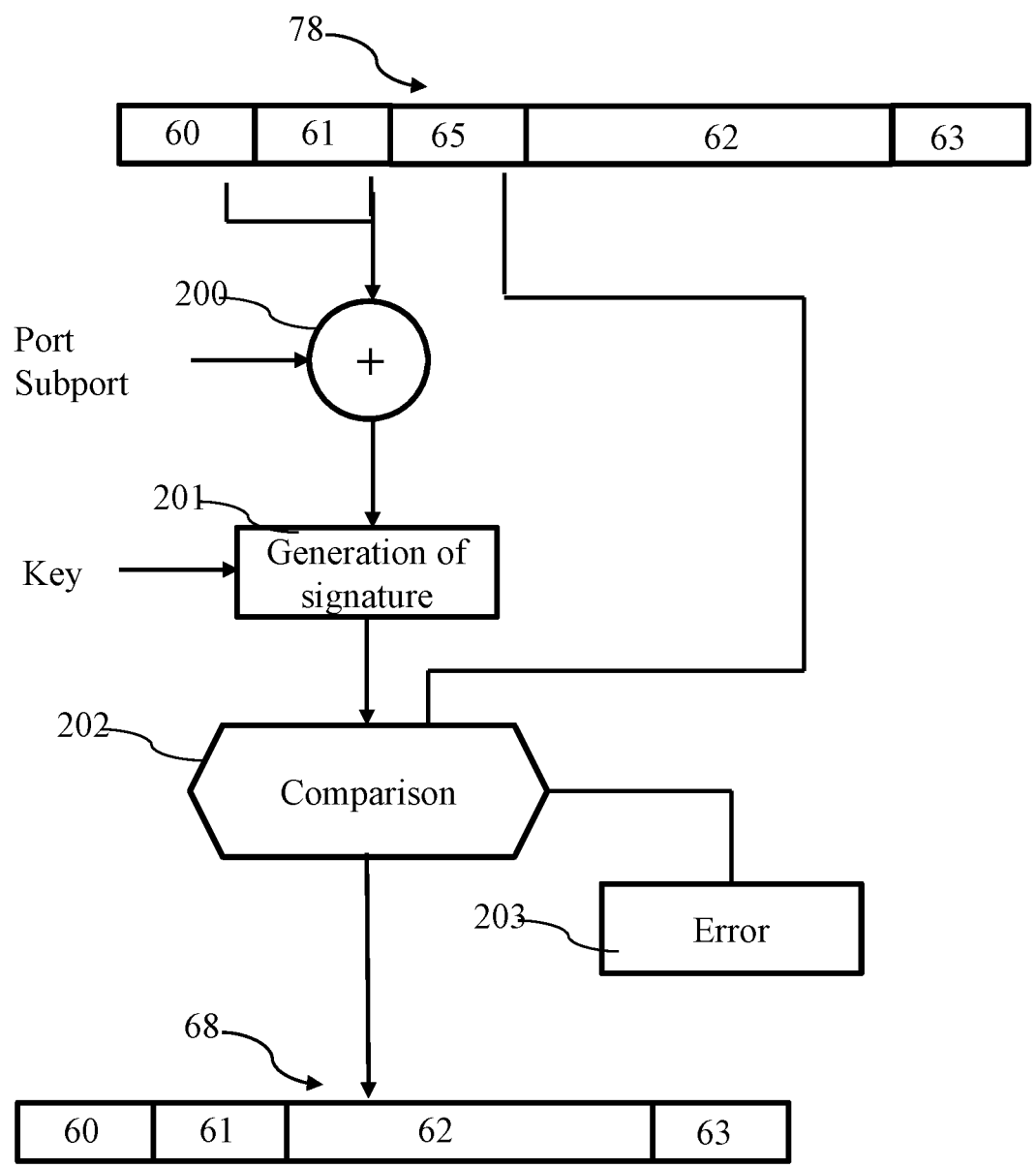
FIG. 3 shows an example of a method for processing, by a device for protecting the routing associated with a physical support, a data frame in which a signature has been inserted.

FIG. 3 shows an example of a method for processing, by a routing protection device 25a to 25d associated with the physical port, a data frame in which a signature has been inserted.

A routing protection device 25 receives a frame 78 from the complex electronic component 10.

The data frame is for example received from an application or is a predetermined data frame that must be received periodically.

The routing protection device 25 associated with the physical port obtains, at the step 200, the source address of the application sending the data in the field 61, or even the destination address, as well as the physical port by which the data frame is received.

The routing protection device 25 associated with the physical port generates, at the step 201, a signature at least from the source address and from the identifier of the physical port or subport obtained.

The routing protection device 25 associated with the physical port compares, at the step 202, the signature included in the field 65 of the data frame with the signature obtained at the step 201.

The routing protection device 25 associated with the physical port performs, at the step 203, a first operation if the first and second signatures are different.

The first operation is an elimination of the data frame received by the routing protection device 25 associated with the physical port if the data frame is a data frame sent by an application.

The present invention provides a watchdog function, throughout the routing and acceleration chain of the complex electronic component 10. If the routing protection device 25 does not receive any service frame with a correct signature during a predetermined unit of time, then the routing protection device 25 performs a reinitialisation of the complex electronic component 10 by means of a dedicated signal denoted 35 in FIG. 1. The service frames are systematically eliminated, whether the signature check be good or bad, by the component 25 and are therefore not transferred in order not to emerge on the ports Porta to Portd.

The routing protection device 25 associated with the physical port performs a second operation if the first and second signatures are identical.

The second operation is an elimination of the first signature in the data frame for a transfer of the data frame to a destination address included in the data frame if the data frame is a data frame sent by an application.

The second operation is an elimination of the data frame received by the routing protection device 25 associated with the physical port if the frame received is a predetermined data frame.

Naturally the present invention is in no way limited to the embodiments described here, but quite the contrary encompasses any variant within the capability of a person skilled in the art.

For example, the present invention is described in an embodiment wherein the data frames are transferred by the complex electronic component to physical ports. The present invention is also applicable in an operating mode in which the data frames are received by the complex electronic component from the physical ports.

The invention claimed is:

1. A method for controlling the functioning of a complex electronic component transferring data frames to physical ports, each data frame comprising at least one source address, wherein, wherein said method causing the device to perform:

insertion, by a software module included in the complex electronic component, in each data frame to be transferred by the complex electronic component, of a first signature determined at least from the source address included in the data frame and from an identifier of the physical port by means of which the data frame is transferred by the complex electronic component, transfer, by the complex electronic component, of the data frame in which the signature has been inserted, reception, by a routing protection device associated with the physical port, of the data frame in which the signature has been inserted, determination, by the routing protection device associated with the physical port, from the identifier of the physical port and the source address, of a second signature, comparison, by the routing protection device associated with the physical port, of the signatures, perform, by the routing protection device associated with the physical port, of a first operation if the first and second signatures are different or of a second operation if the first and second signatures are identical, wherein the data frames are predetermined service frames transferred periodically and the first operation is at least a non-processing of the service frame and an elimination of the service frame received by the routing protection device associated with the port and a reinitialisation of the complex electronic component if a predetermined number of service frames are not received during a predetermined period, and the second operation is a processing of the service frame and an elimination of the service frame received by the routing protection device associated with the port.

2. The method according to claim 1, wherein the first operation is an elimination of the data frame received by the routing protection device associated with the physical port and the second operation is an elimination of the first signature in the data frame for a transfer of the data frame to a destination address included in the data frame.

3. The method according to claim 2, wherein the method further causing the device to perform counting the eliminated data frames.

4. The method according to claim 2, wherein the signatures are also determined from the destination address.

5. The method according to claim 2, wherein the signatures are also determined from all or some of the data included in the data frame.

6. The method according to claim 2, wherein the signatures are also determined from the quantity of data included in the data frame.

7. The method according to claim 1, wherein the complex electronic component and each routing protection device associated with a physical port are included in an aircraft.

8. The method according to claim 7, wherein the aircraft comprises various secure zones.

9. The method according to claim 1, wherein the signatures are obtained from a function of the exclusive OR type or from a hash function using a coding key shared solely between the software module and each routing protection device.

10. A system for controlling the functioning of a complex electronic component transferring data frames to physical ports, each data frame comprising at least one source address, wherein the system comprises circuitry causing the system to perform:

insertion, by a software module included in the complex electronic device, in each data frame to be transferred by the complex electronic component, of a first signature determined at least from the source address included in the data frame and an identifier of the physical port by means of which the data frame is transferred by the complex electronic component, transferring, by the complex electronic component, the data frame in which the signature was inserted, receiving, by a routing protection device associated with the physical port, of the data frame in which the signature was inserted, determining by the routing protection device associated with the physical port, from the identifier of the physical port and the source address, a second signature, comparing, by the routing protection device associated with the physical port, the signatures, and performing by the routing protection device associated with the physical port, a first operation if the first and second signatures are different or a second operation if the first and second signatures are identical and wherein the data frames are predetermined service frames transferred periodically and the first operation is at least a non-processing of the service frame and an elimination of the service frame received by the routing protection device associated with the port and a reinitialisation of the complex electronic component if a predetermined number of service frames are not received during a predetermined period, and the second operation is a processing of the service frame and an elimination of the service frame received by the routing protection device associated with the port.

\* \* \* \* \*